Figure 4:
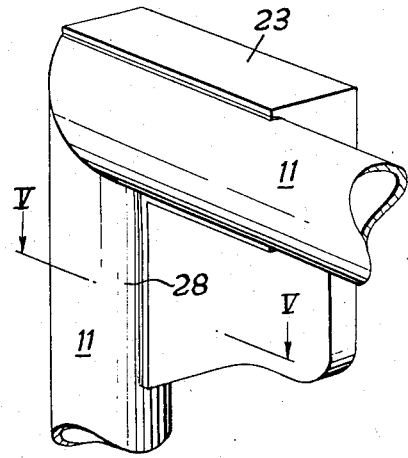

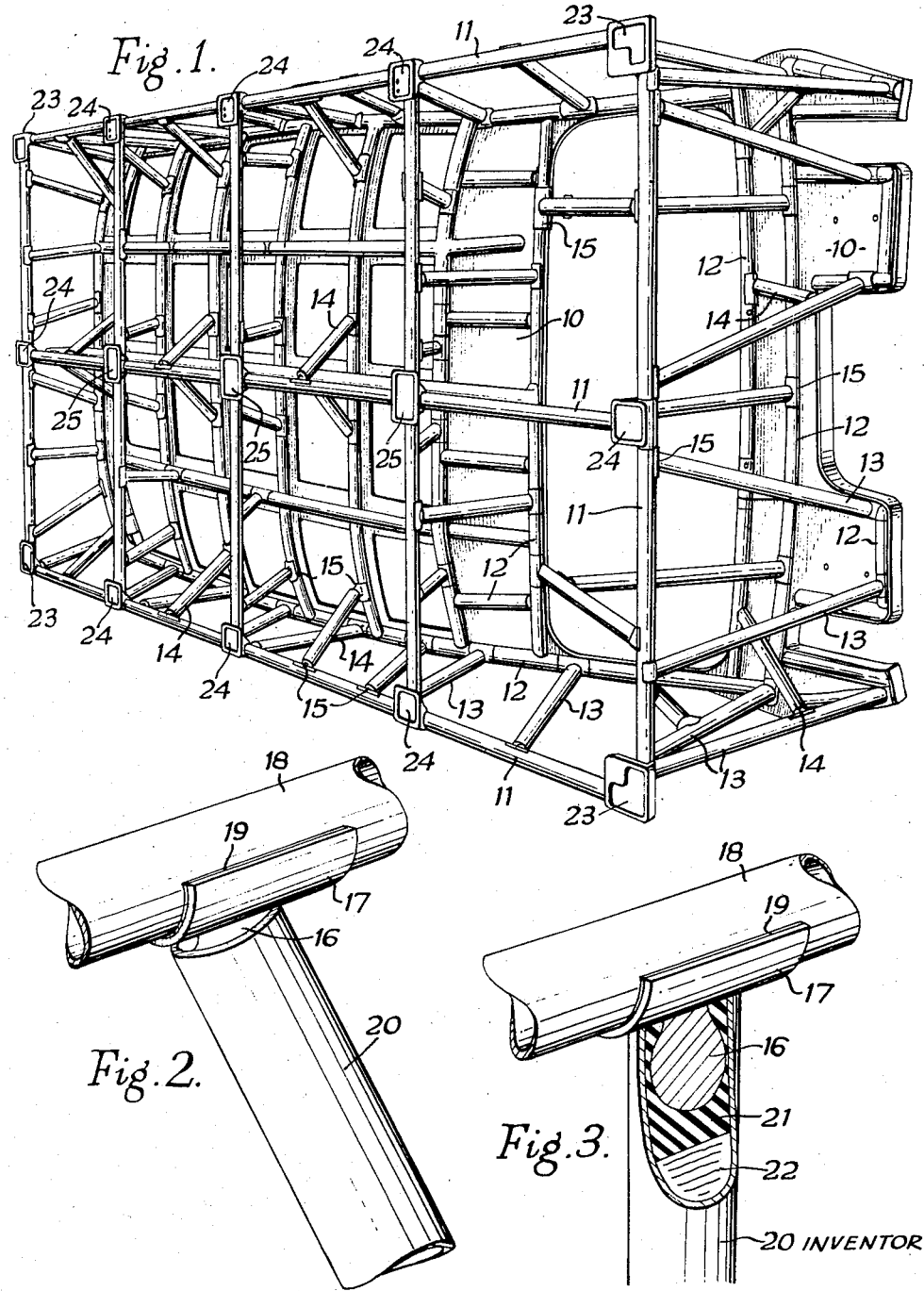

July 21, 1959 S. O. JONES 2,895,224
PLASTIC DIES, JIGS AND THE LIKE
Filed March 29, 1957 2 Sheets-Sheet 2

INVENTOR
Stanley O. Jones
BY Karl L. Schiff
HIS AGENT

United States Patent Office 2,895,224
Patented July 21, 1959

2,895,224

PLASTIC DIES, JIGS AND THE LIKE

Stanley O. Jones, Headington, Oxford, England, assignor to Pressed Steel Company Limited, Cowley, Oxford, England, a British company Application March 29, 1957, Serial No. 649,496

3 Claims. (Cl. 33—174)

This invention relates to plastic dies, jigs, fixtures, gauges, spotting frames and the like and concerns particularly a framework of the kind utilised for supporting the operative surfaces of such devices.

At the present time many devices of this kind are produced in which the actual working surfaces are formed of, for example, fibre glass bonded with a synthetic resin material and such devices are usually mounted permanently on a tubular framework whereby the production of such devices is simplified and they themselves are of much lighter weight than similar devices hitherto produced.

In order to provide the framework with a stable base feet are bonded to the framework. It is necessary that these should be accurately located.

An object of the present invention is to provide an improved framework for supporting dies, jigs, spotting frames and the like which can be produced much more readily and economically than hitherto, which possesses great lightness and which, although very simple in construction, is very robust and rigid and ensures the necessary degree of accuracy required in the die, fixture or the like.

It has been known to produce supporting frameworks of the kind indicated constructed of tubes interconnected in the desired conformation by means of corner brackets and the like, which brackets and tubes are all finally bonded together by means of a synthetic resin material.

According to the present invention a framework of the kind indicated is built up of tubular members at least some of which are connected in the framework through the intermediary of a ball type joint so that in the assembly of the framework such members may be positioned by swivelling on the ball and thereafer be fixed by bonding the joint with a cement.

As a further feature of the present invention there may be provided feet for the base of the framework, each having an accurate plane under surface and being formed with an upper surface adapted to receive members of the framework and hold them in place in their desired relative positions, and to be bonded to said members of the framework.

The invention allows a wide range of adjustability during the construction of the framework which, it will be clear, very greatly simplifies the construction of the framework and reduces its cost.

The ball member of the ball joint may consist of a ball formed integrally with or secured to a flat or preferably semi-circular saddle piece which overlies and may be secured to, in any desired position, one of the tubular members of the framework, for example, by bonding it thereto with a synthetic resin cement. Alternatively the ball member may be secured directly to a tube, without a saddle, for example, by screwing it to the tube. When the ball is in position a tubular frame member is placed over the ball and it is then positioned as desired and finally bonded in position by means of a synthetic resin cement. It is not necessary to form the ends of the tubes in any particular way, but, if desired the ends of the tubes may be contoured to fit the adjacent tube snugly, thus giving a neater joint.

In order to prevent the cement from running down the interior of the tube a plug, for example, of wood or the like, may be placed in the tube before it is engaged with the ball.

It will be clear that the invention allows a very great degree of adjustment of the tubular members and accordingly great accuracy in the original length of the members and the formation of their ends is not required. When, for example, two tubular members of the framework are to be braced by a diagonal or vertical strut it is simply necessary to place a ball and saddle on one of the two members, engage the strut tube on the ball, engage the opposite end of the tube with a second ball and saddle member and place the second saddle on the other of the two members and then move both saddle members and the strut tube to the desired position whereupon the saddles are bonded to the tubular members and the strut is bonded to the balls by means of a synthetic cement. When the synthetic cement has set, a rigid and immovable strut is provided.

The feet may be formed with two or more semi-circular recesses arranged at the appropriate angles to each other, whereby the members of the framework are connected, for example, in a L-, T-, or X-joint. If desired, of course, the feet may be formed with a greater number of recesses to provide a union for five or more adjacent members. For all normal constructions, however, it will probably be found sufficient to provide a set of feet, some setting an L-joint, some a T-joint and some an X-joint.

By building the framework on a true flat surface, all the feet, of which there may be four or more in number, may be set in accurate horizontal alignment. The tubular members are then set approximately with respect to the feet and the members and feet are all bonded together by means of a synthetic resin cement. When the cement is set, a very rigid yet light and robust framework is provided with accurately located feet.

Figure 5:
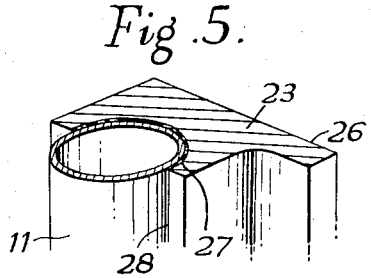
Figure 6:
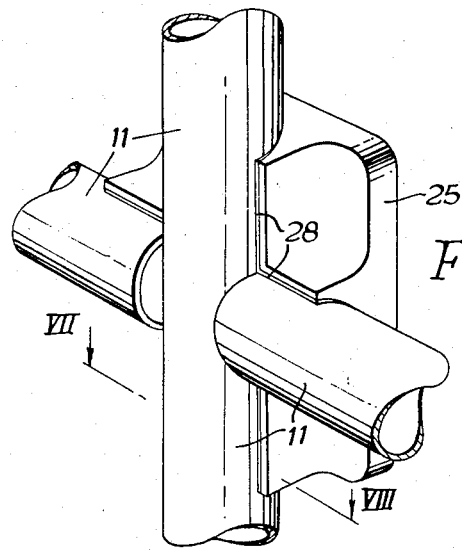
Figure 7:
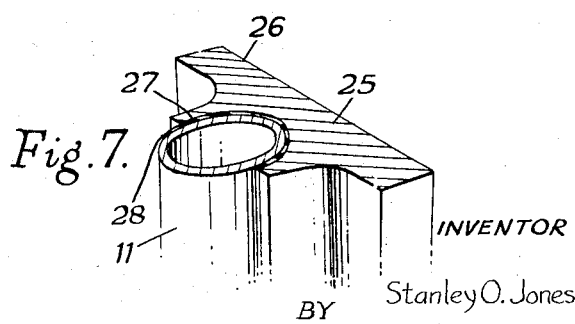

The invention will now be described by way of example with reference to the accompanying drawings in which Fig. 1 is a perspective view of a framework according to the invention, viewed from the underside, Fig. 2 is a perspective view of a ball joint for a framework according to the invention on a larger scale than Fig. 1, Fig. 3 is a partially sectional perspective view similar to Fig. 2, Fig. 4 is a perspective view of a foot for a framework, Fig. 5 is a sectional view along the line V—V in Fig. 4, Fig. 6 is a perspective view of another foot for a framework, and Fig. 7 is a sectional view along the line VII—VII in Fig. 6.

Referring to Fig. 1 there is shown a framework supporting a working surface 10. The framework comprises tubular members 11 forming a lower lattice, tubular members 12 forming an upper lattice which directly supports the working surface 10 and tubular members 13 supporting the upper lattice on the lower lattice. The framework also includes tubular bracing members 14.

The majority of the joints, such as those numbered 15, take the form of ball joints such as are shown in Figs. 2 and 3.

Referring to Figs. 2 and 3 a ball 16 is rigidly fixed to a saddle 17. The saddle 17 is semi-circular in section and is thus adapted to fit round a tubular member 18 to which it is bonded by means of a synthetic cement 19. In forming the joint a tubular member 20 is fitted over the ball 16 and when the relative positions of the members 18 and 20 have been correctly adjusted the ball 16 is sealed in the member 20 by a synthetic cement 21.

The tubular member 20 is provided with a wooden plug 22 to prevent the synthetic cement 21 running down the member 20 when in a non-set state.

Referring again to Fig. 1 feet 23, 24 and 25 are bonded to the lower lattice comprising members 11 at each junction between members 11. The feet 23, 24, 25 are adapted to receive the ends of the members 11 at an L junction, a T junction, and an X junction of the members 11 respectively.

A foot 23 is shown in greater detail in Figs. 4 and 5 and a foot 25 is shown in greater detail in Figs. 6 and 7.

The feet 23 and 25 have accurate plane under surfaces 26. The upper surface is formed as shown at 27 to receive and nest the tubular members 11 and hold them in correct location. The tubular members 11 are bonded in the feet 23 and 25 by a synthetic cement 28.

The ball and saddle as shown in Figs. 2 and 3 may be produced as sets of standard fitting, for use with tubes of different diameters, alternatively the saddle may be flat for use in securing a tubular member to a flat member of the framework, for example, a flat topped supporting foot of the framework.

Using joints as described above it is possible to build a strong and rigid framework much more quickly than has been possible hitherto and this still further greatly reduces cost of production. The feet as described above enable the framework to be provided with an accurate base very readily, and assist in the alignment of the tubular members forming the lower part of the framework. The framework may even in some instances be built by relatively unskilled labour.

What I claim is:

1. A framework for supporting the operative surface of a plastic die, jig, fixture, gauge, spotting frame or the like, said framework being bonded with a cement to form a rigid structure and comprising tubular members and ball joint members forming joints between at least some of said tubular members, said ball joint members each being rigidly bonded to the outside of one tubular member and having a ball portion projecting into and being rigidly bonded to the interior of the end of an adjoining tubular member, said ball joint members allowing the relative positions of said tubular members to be adjusted before the framework is bonded into a rigid structure.

2. A framework for supporting the operative surface of a plastic die, jig, fixture, gauge, spotting frame or the like, said framework being bonded with a cement to form a rigid structure and comprising tubular members and ball joint members forming joints between at least some of said tubular members, said ball joint members each comprising a ball and a saddle, said ball being fixed to said saddle and projecting into and rigidly bonded to the end of one of said tubular members, said saddle fitting over and being bonded to the exterior of another of said tubular members.

3. A framework for supporting the operative surface of a plastic die, jig, fixture, gauge, spotting frame or the like, said framework being bonded with a cement to form a rigid structure and comprising tubular members and ball joint members forming joints between at least some of said tubular members said ball joint members each comprising a ball and a saddle, said ball being fixed to said saddle and adapted to enter the end of one of said tubular members, said saddle being arcuate in section and adapted to partially embrace another of said tubular members and to be bonded thereto.

References Cited in the file of this patent

UNITED STATES PATENTS

| | | |
|---|---|---|
| 1,091,812 | Corthell | Mar. 31, 1914 |
| 1,772,159 | Roth | Aug. 5, 1930 |
| 1,808,082 | Thompson | June 2, 1931 |
| 1,908,821 | Cornell | May 16, 1933 |
| 2,371,047 | Groehn | Mar. 6, 1945 |
| 2,640,391 | Moseley | June 2, 1953 |
| 2,715,280 | Kish | Aug. 16, 1955 |
| 2,777,790 | Kish | Jan. 15, 1957 |
| 2,830,320 | Hill | June 17, 1958 |